United States Patent [19]
Shipley

[11] Patent Number: 5,491,573
[45] Date of Patent: Feb. 13, 1996

[54] OPTICAL SIGNAL TRANSMISSION NETWORK

[75] Inventor: Simon P. Shipley, Aylesbury, United Kingdom

[73] Assignee: GPT Limited, United Kingdom

[21] Appl. No.: 284,514

[22] PCT Filed: Feb. 5, 1993

[86] PCT No.: PCT/GB93/00247

§ 371 Date: Sep. 9, 1994

§ 102(e) Date: Sep. 9, 1994

[87] PCT Pub. No.: WO93/16533

PCT Pub. Date: Aug. 19, 1993

[30] Foreign Application Priority Data

Feb. 7, 1992 [GB] United Kingdom ................ 9202564.2

[51] Int. Cl.$^6$ ...................................................... H04B 10/08
[52] U.S. Cl. ........................... 359/110; 359/156; 356/73.1
[58] Field of Search ........................... 359/110, 118–121, 359/168–169, 173, 156, 122; 356/73.1; 250/227.15

[56] References Cited

U.S. PATENT DOCUMENTS

| 5,177,354 | 1/1993 | Tomita et al. | 356/73.1 |
| 5,187,362 | 2/1993 | Keeble | 356/73.1 |
| 5,383,015 | 1/1995 | Grimes | 359/110 |

FOREIGN PATENT DOCUMENTS 2141641  8/1990  Japan.

Primary Examiner—Leo H. Boudreau
Assistant Examiner—Kinfe-Michael Negash
Attorney, Agent, or Firm—Kirschstein, et al.

[57] ABSTRACT

Fault location in an optical signal transmission network in which a main optical fibre is divided into a plurality of branch circuits, is simplified. Optical time domain reflectrometry (OTDR) equipment transmits an output signal along the main fibre, and for each branch circuit the signal is caused to be returned to the OTDR equipment from the branch to be modified in a manner unique to that branch.

3 Claims, 2 Drawing Sheets

OPTICAL SIGNAL TRANSMISSION NETWORK

BACKGROUND OF THE INVENTION

This invention relates to optical signal transmission networks, as may be used, for example, in optical fibre telecommunications, and relates, in particular, to a fault location and diagnostic systems for use with such networks.

Over the past decade, optical time domain reflectometry, hereinafter referred to as OTDR, has become an established tool for the location and evaluation of the features on an optical fibre route. For example, OTDR techniques are now commonly used to determine both the position and loss of splices and connectors and the position of line breaks as well as providing a means for making single-ended, real-time system loss measurements.

In use of an optical time domain reflectometer a short pulse of light is launched into an optical fibre under test and the backscattered signal is monitored as a function of the time of flight (or equivalently distance) along the fibre. The magnitude of the backscattered signal depends on the Rayleigh scattering, attenuation, inhomogeneities, splices, components and the optical power level in the fibre. Features in the trace of backscatter versus time may then be correlated with the presence of discontinuities and disruptions in the fibre route.

Whilst OTDR techniques are extremely valuable as a diagnostic tool for the location of faults in simple point to point inks there is now an increasing trend towards more complex passive optical networks.

In such networks a number of branch circuits may emanate from a single optical fibre connected, for example to a telephone exchange, and the branch circuits may be further divided into further branch circuits. Such an arrangement can provide a significant cost reduction by utilising the available bandwidth to share said single exchange fibre amongst a number of customers, thereby reducing the level of exchange equipment and fibre installation costs borne by each customer.

It will, however, be apparent that when a signal from OTDR equipment is transmitted along said single fibre, and thence to the branch circuits, the signal which is returned at any instant, following the transmission of an output signal from the OTDR equipment, will be made up of light backscattered from many points in the network at the same distance from the equipment. This makes the location of a fault in the network difficult and time-consuming.

SUMMARY OF THE INVENTION

An object of the invention is to provide a means of simplifying such fault location.

According, therefore, to the invention, in an optical signal transmission network comprising a main optical fibre having a plurality of branch circuits, and associated with OTDR equipment connected so as to transmit an output signal through said main fibre and said branch circuits, each said branch circuit incorporates, means for causing the signal returned to the OTDR equipment from said branch to be modified in a manner unique to that branch, and the OTDR equipment has means for distinguishing the signals returned from the individual branch circuits.

In one arrangement in accordance with the invention, the OTDR is capable of being tuned to provide signals in a selected wavelength band, and each branch circuit incorporates a filter capable of passing traffic wavelengths, and one or more respective pass wavelengths in the OTDR band, without significant loss, but of attenuating all other wavelengths in the band, the filters being so related that a signal returned to the OTDR equipment from any branch of the network has a wavelength unique to that branch. Accordingly any branch circuit having a fault can be unambiguously identified, and measurement of fault conditions can be carried out as in a point to point, rather than a point to multipoint system.

In an alternative arrangement each branch circuit incorporates means for modulating the output signal from the OTDR equipment at a unique frequency and the OTDR incorporates detector means capable of being tuned to respond to a selected one of individual frequencies of the various branch circuits.

Instead of straightforward loss modulation of the OTDR output signal, each of the individual branch circuits may incorporate, instead, means for modulating the state of polarisation of the output light signal from the OTDR equipment in a unique manner, the ODTR incorporating means for detecting the state of polarisation of the returned signals. Decoding of the returned signal may be achieved by splitting it into two polarised components, the intensity of which will have components at the modulation frequency. Unambiguous measurements of the various route segments may then be made as with the loss modulation technique.

The filters or modulating means, as the case may be, are preferably disposed adjacent the beginning of the respective branches.

BRIEF DESCRIPTION OF THE DRAWINGS

The invention will be further explained by way of example with reference to FIGS. 1 to 4 of the accompanying drawings, in which.

DETAILED DESCRIPTION OF THE PREFERRED EMBODIMENT

Figure 1:
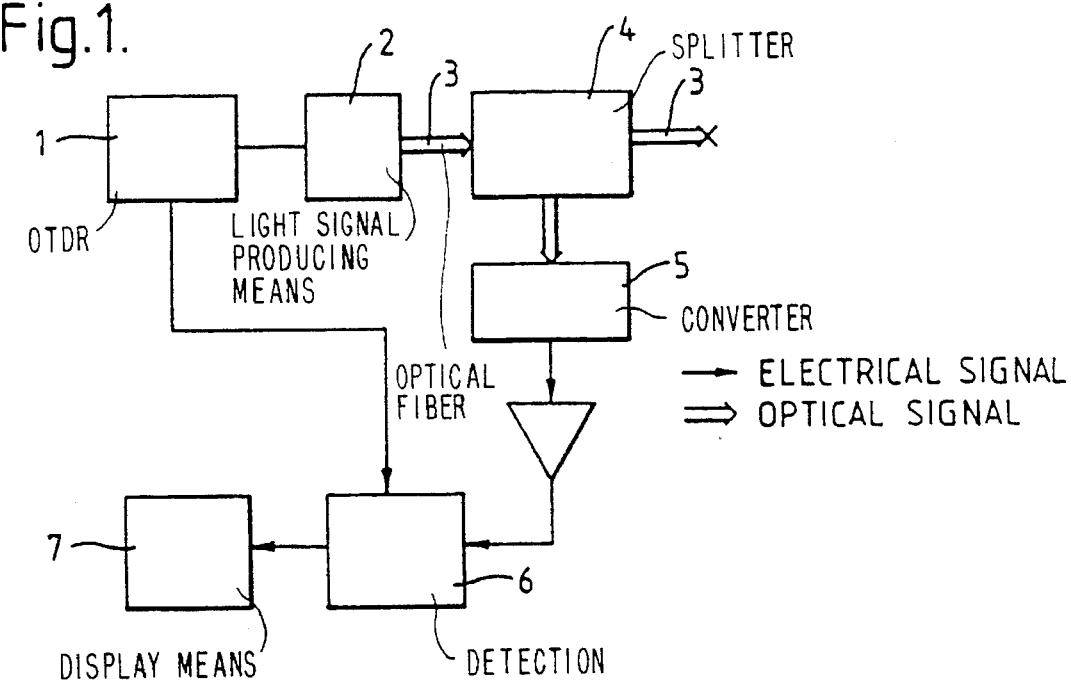
FIG. 1 represents in diagrammatic form a typical OTDR system.

Referring first to FIG. 1, the OTDR equipment illustrated incorporates an electrical pulse generator 1, the output of which is fed to means 2 for producing a light signal in a selected waveband, and this is fed, in turn, into an optical fibre 3.

When a signal is generated by the OTDR equipment, a signal will be returned along the fibre 3 made up of light backscattered from splices, disconformities and possible faults in the fibre, the returned signal being fed via a directional coupler or beam splitter 4 to a convertor 5 and detector 6 responsive to the returned signal, and display means for indicating the signal value at selected instants following the transmission of the output signal, i.e. after selected round trip delay times, and this accordingly enables the location of any fault in the fibre to be readily determined.

Such an arrangement operates quite satisfactorily where there is only a single output fibre. However where the fibre 3 has connected to it a plurality of branch circuits, as, for example in the case of an optical telecommunication system, the returning signal at any instant will be made up of light bachscattered from many individual points at the same distance from the OTDR equipment, making the extraction of useful information from the equipment extremely complex.

Figure 2:
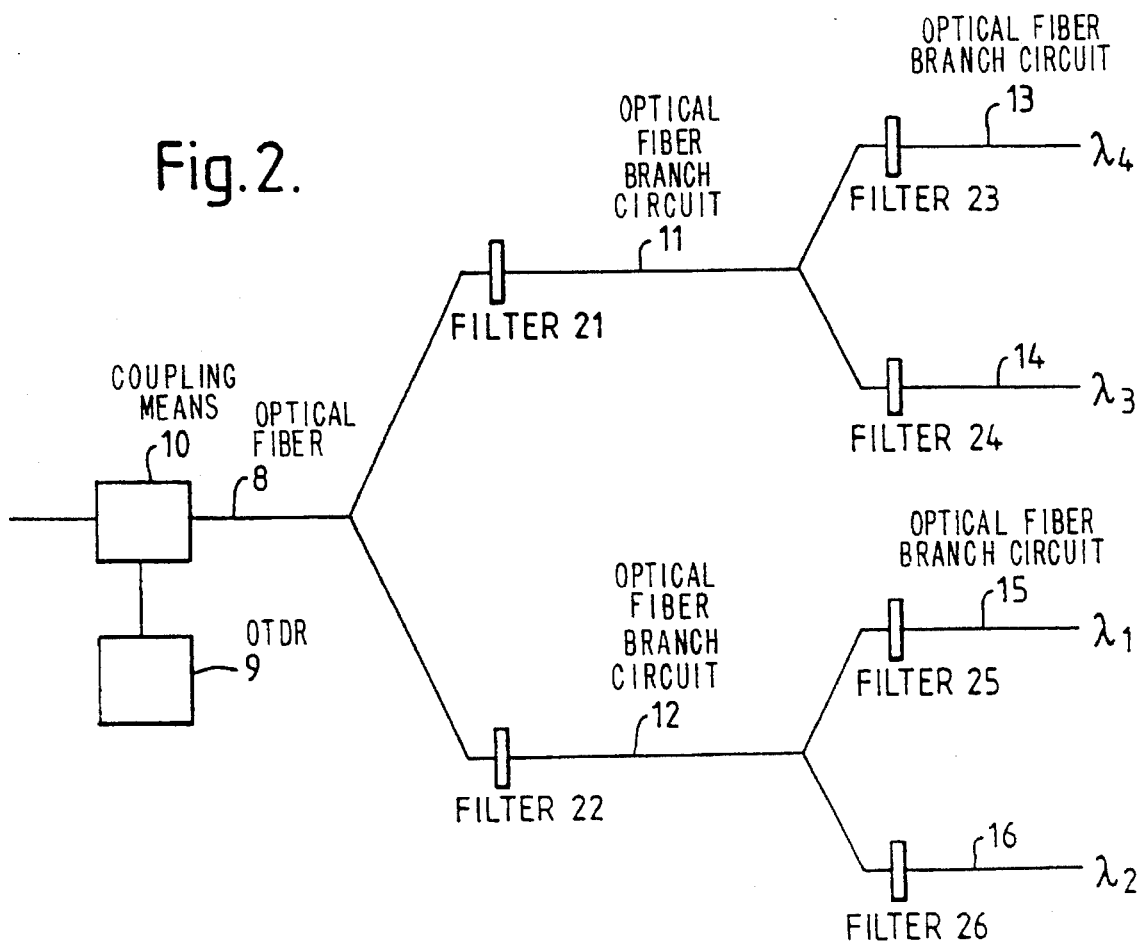
FIG. 2 represents part of an optical fibre telecommunication network employing one embodiment of the invention.

FIG. 2 illustrates how the invention avoids this difficulty, and represents, in simplified form, part of an optical fibre telecommunication network comprising a main fibre 8 connected to a telephone exchange (not shown) and feeding two branch circuits 11, 12, each of these feeding, in turn, two further branch circuits 13, 14 and 15, 16 respectively.

OTSR equipment, shown diagrammatically at 9 feeds output signals into the fibre 8 through suitable coupling means 10, the signals being transmitted from the fibre 8 into the various branch circuits. In accordance with the invention each branch circuit is provided, adjacent the respective branch point, with a dielectric filter 21, 22, 23, 24. The filters are such that they do not introduce any significant loss at traffic wavelengths (for example 1200 to 1570 nm) or at the designated OTDR pass wavelength, but are such that signals returned to the OTDR equipment from any branch of the network have a wavelength unique to that branch. Accordingly each possible route is assigned a unique OTDR wavelength, and by tuning the OTDR source wavelength across the allocated OTDR band, each individual route will be selected in turn.

Characterisation of the selected route may then proceed as if it is a simple point to point link.

Figure 3:
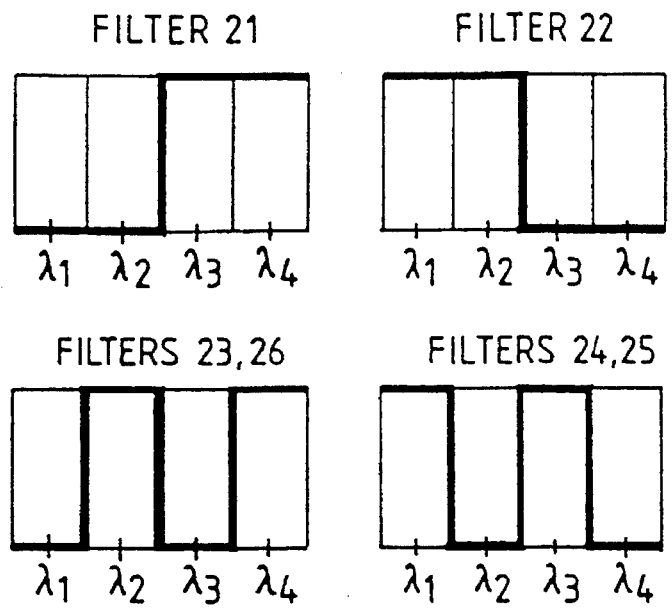
FIG. 3 illustrates the manner of operation of this embodiment of the invention.

FIG. 3 illustrates a manner in which this may be achieved in the simple branch circuit shown in FIG. 2. Thus filter 21 heavily attenuates or reflects wavelengths $\lambda_1$ and $\lambda_2$, while passing wavelengths $\lambda_3$ and $\lambda_4$. Filter 22 heavily attenuates or reflects wavelengths $\lambda_3$ and $\lambda_4$ while passing wavelengths $\lambda_1$ and $\lambda_2$. Filters 23 and 26 heavily attenuate or reflect wavelengths $\lambda_1$ and $\lambda_3$ and pass wavelengths $\lambda_2$ and $\lambda_4$ and filters 24 and 25 heavily attenuate or reflect wavelengths $\lambda_2$ and $\lambda_4$ and pass wavelengths $\lambda_1$ and $\lambda_3$.

It will therefore be seen that wavelength $\lambda_4$ is unique to branch 13, $\lambda_3$ to branch 14, $\lambda_1$ to branch 15 and $\lambda_2$ to branch 16.

Figure 4:
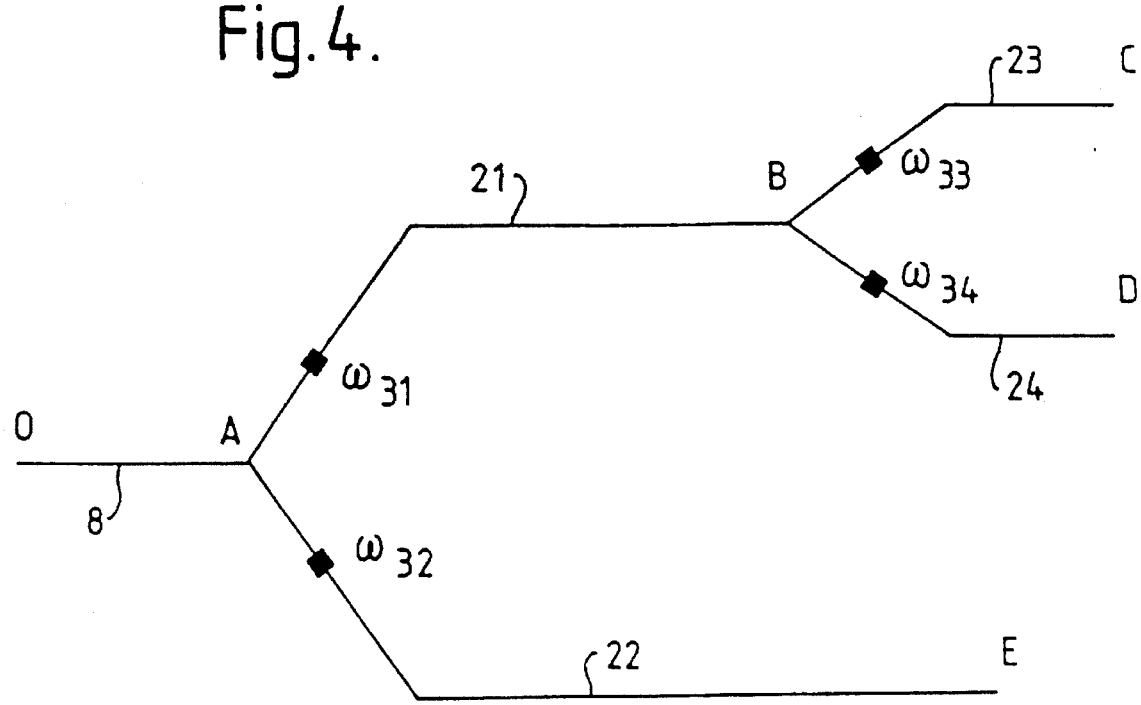
FIG. 4 represents part of an optical fibre telecommunication network employing an alternative embodiment of the invention.

FIG. 4 illustrates part of an optical fibre telecommunication network comprising a main fibre 8, first branch circuits 21, 22 and further branch circuits 23,24. In this case each of the branch circuits 21 to 24 incorporates, adjacent the branch point, a modulator 31 to 34 respectively. OTDR equipment feeds output signals into the fibre 8 through suitable coupling means (not shown), and the modulators in the various branch circuits are arranged to modulate the OTDR signals at unique wavelengths.

The length OA is single pathed and hence may be characterised by standard 'DC' OTDR measurements. Lengths ABC and ABD return OTDR signals modulated at frequency 31, and will therefore have a non-zero component at this frequency, whilst route AE, which is modulated at ω32, has no component at 31. Thus length AB has been uniquely determined. Similarly selecting frequency ω33 or ω34 allows measurement of BC or BD respectively.

Many mechanisms for such loss modulation may be envisaged, but a low cost, clip-on modulator would be ideal. This restricts the modulation scheme to one in which the fibre is physically perturbed. If primary coated fibre is accessible, then microbending may be conveniently used to induce loss, where as jacketed fibre could more easily be modulated by inducing periodic bulk bend loss. Acousto-optic or other forms of modulators might also be used for some applications. The depth of the loss modulation will, however, be limited by the need to maintain a minimum required error performance for the system.

In a modification of the embodiment illustrated in FIG. 4, the modulators 31 to 34 may be replaced by modulators which modulate the polarisation of light under examination. By this means it is possible to determine the returned signal without disrupting traffic signals to any significant extent. Decoding of the returned signal can be achieved by splitting it into two orthoganally polarised components, the intensity of which will have components at the modulation frequency. Unambiguous measurements of the various route segments may then be made as with the loss modulation technique described above.

It will be appreciated that although the invention has been explained with reference to simple networks, it can readily be applied to more complicated networks, by the use of suitable filters or modulators as the case may be. Moreover although it is primarily concerned with the location of faults in optical fibre telecommunication systems it may also be used to advantage in other systems employing multibranched optical fibre networks.

I claim:

1. An optical signal transmission network, comprising: a main optical fibre having a plurality of branch circuits, and associated with optical time domain reflectometry (OTDR) equipment connected so as to transmit an output signal through said main fibre and said branch circuits, each said branch circuit incorporating means for modulating the state of polarization of the output signal from the OTDR equipment in a manner unique to that branch, and the OTDR equipment incorporating means for detecting the state of polarization of the returned signals for distinguishing the signals returned from the individual branch circuits.

2. An optical signal transmission network according to claim 1 wherein the detecting means comprises means for splitting the returned signals into two polarized components.

3. An optical signal transmission network according to claim 1 wherein the modulating means are disposed adjacent the beginning of the respective branch circuits.

* * * * *